Sept. 6, 1960 L. A. BOGAR 2,951,599
VEHICLE PARKING DEVICE
Filed June 15, 1956 8 Sheets-Sheet 1

Lawrence A. Bogar
INVENTOR.

BY *Lawrence A. O'Brien*
*and Harvey B. Jacobson*
Attorneys

Sept. 6, 1960 L. A. BOGAR 2,951,599
VEHICLE PARKING DEVICE
Filed June 15, 1956 8 Sheets-Sheet 2

Lawrence A. Bogar
INVENTOR.

BY *Lawrence A. O'Brien*
*and Harvey B. Jackson*
Attorneys

Sept. 6, 1960 L. A. BOGAR 2,951,599
VEHICLE PARKING DEVICE
Filed June 15, 1956 8 Sheets-Sheet 3
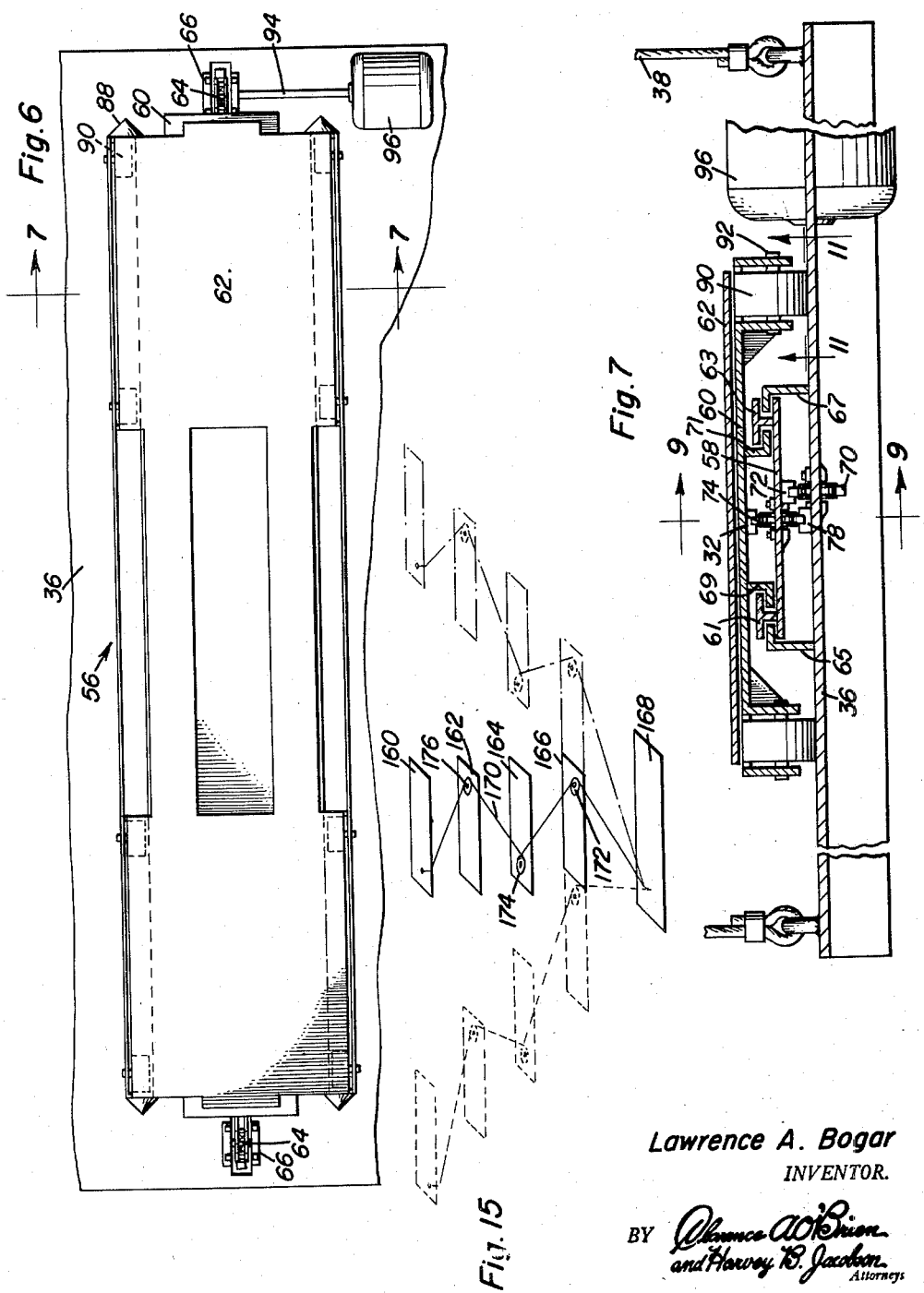
Lawrence A. Bogar
INVENTOR.
BY Lawrence A. O'Brien
and Harvey B. Jacobson
Attorneys

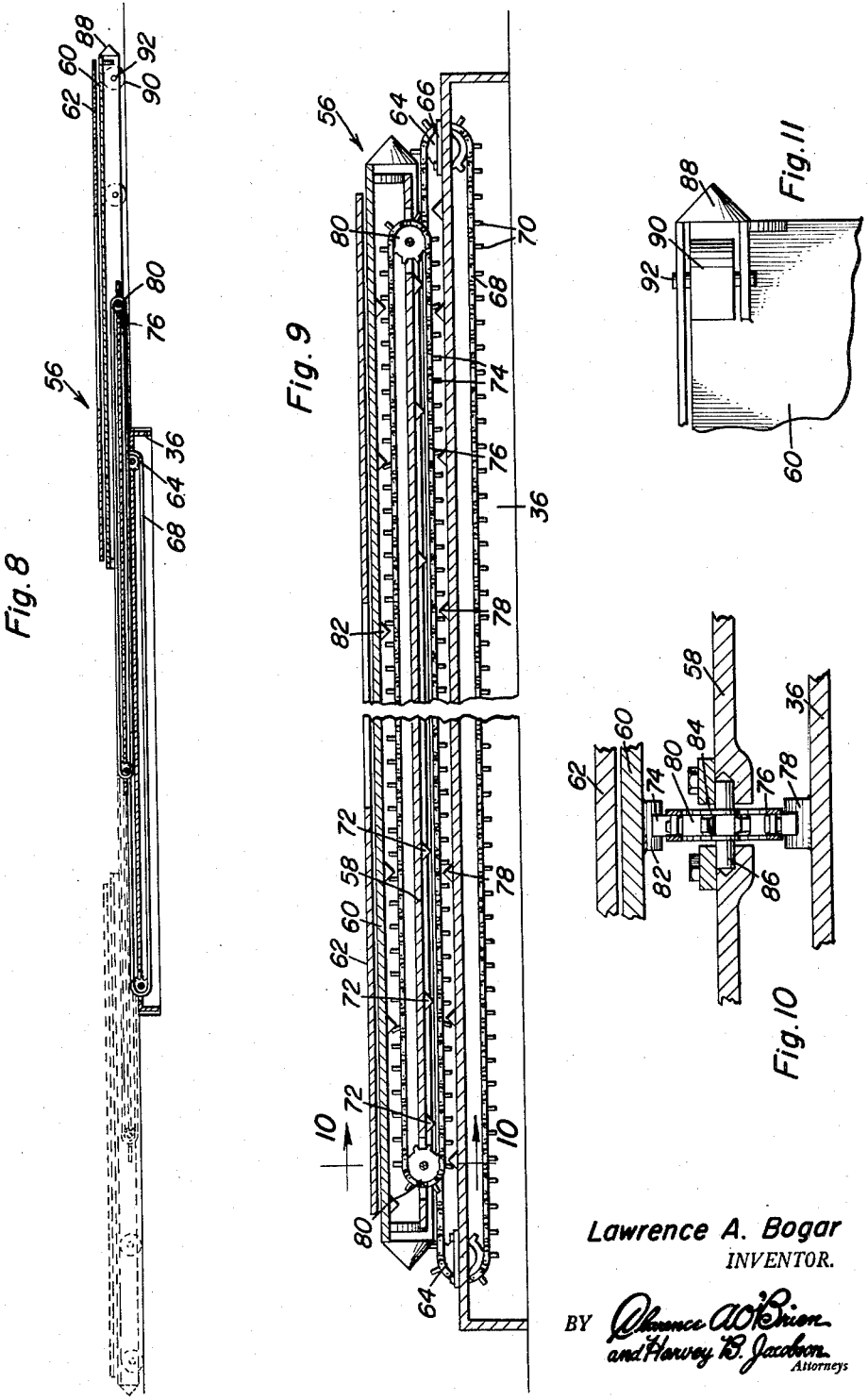

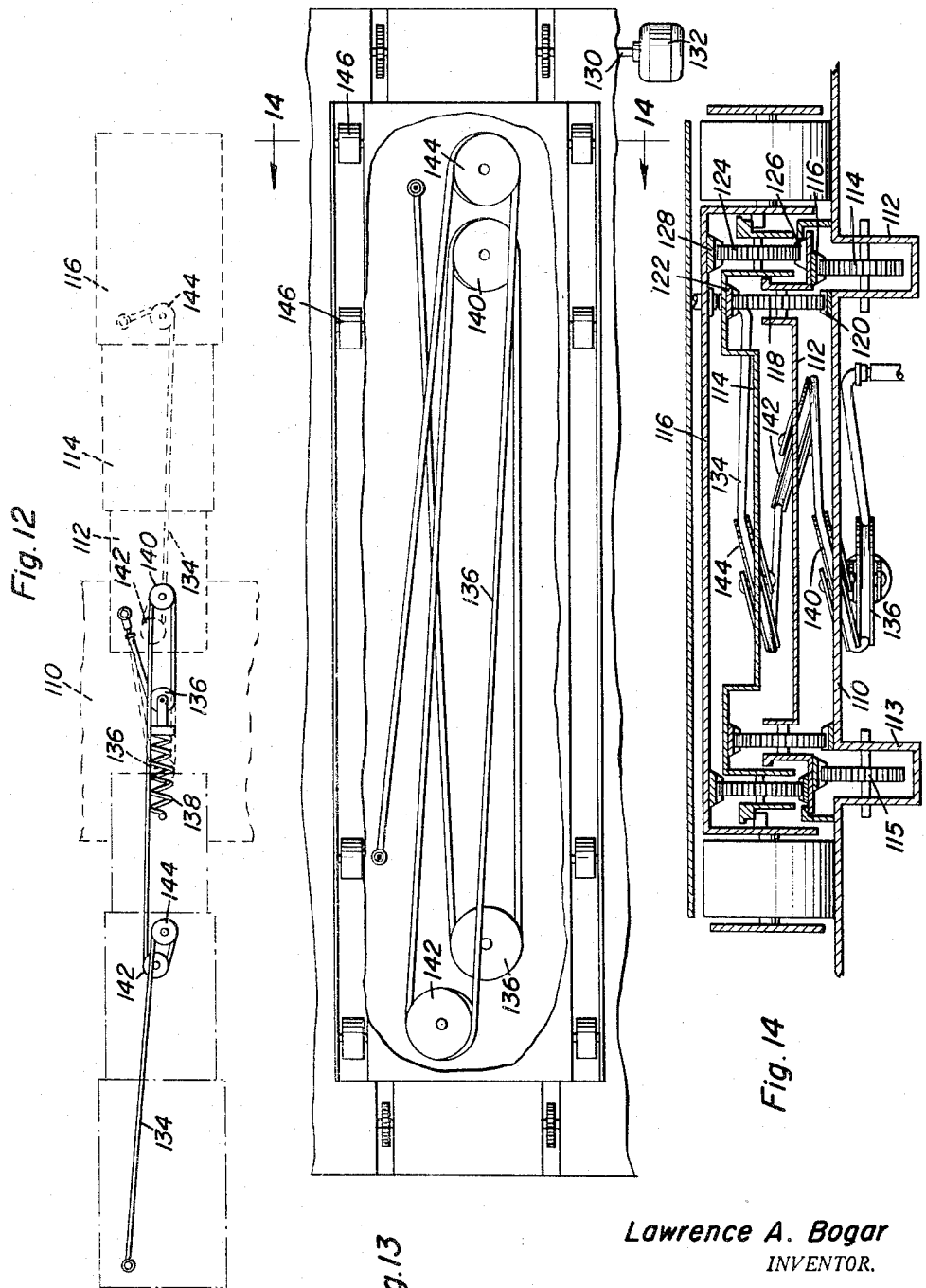

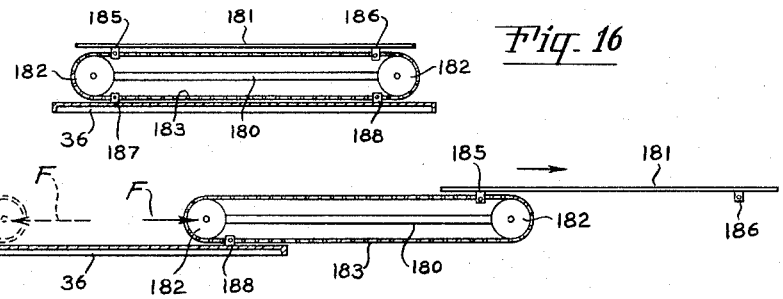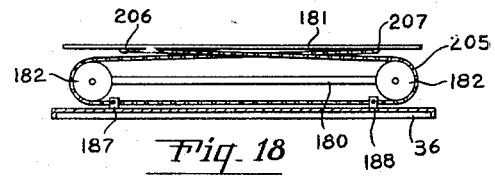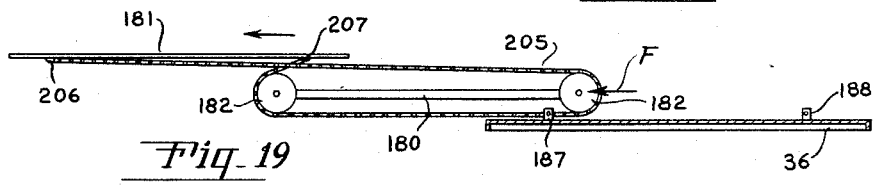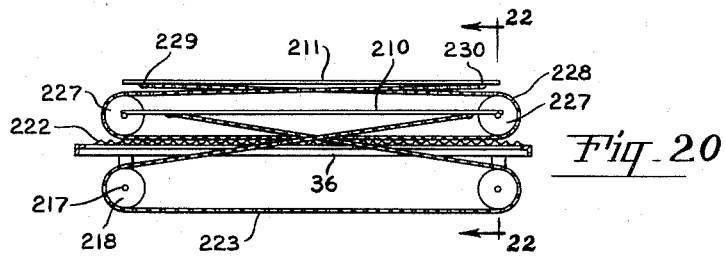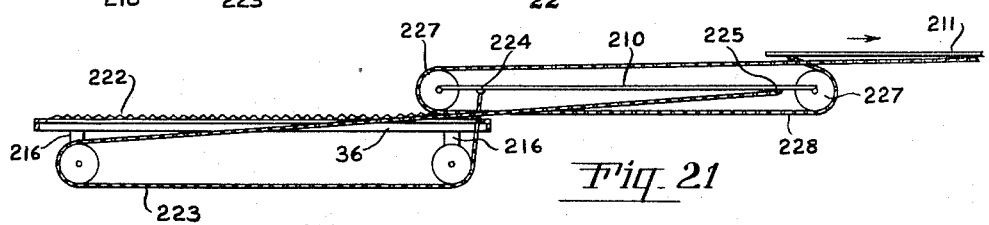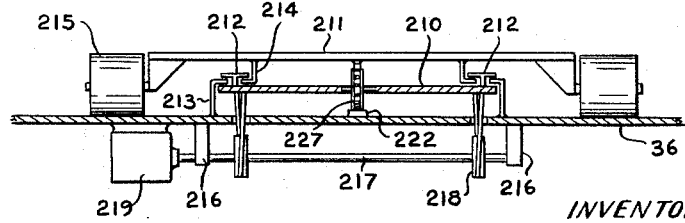

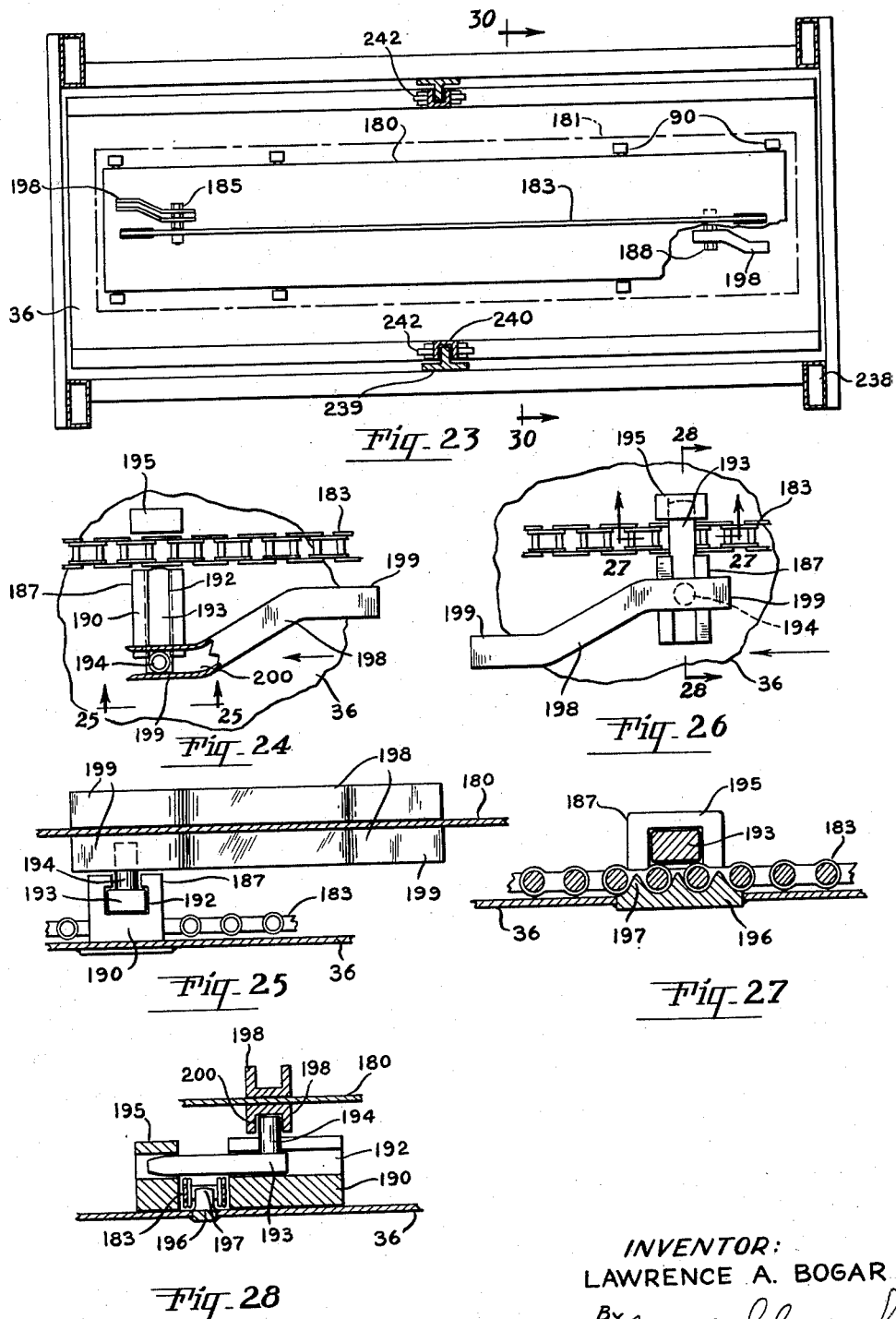

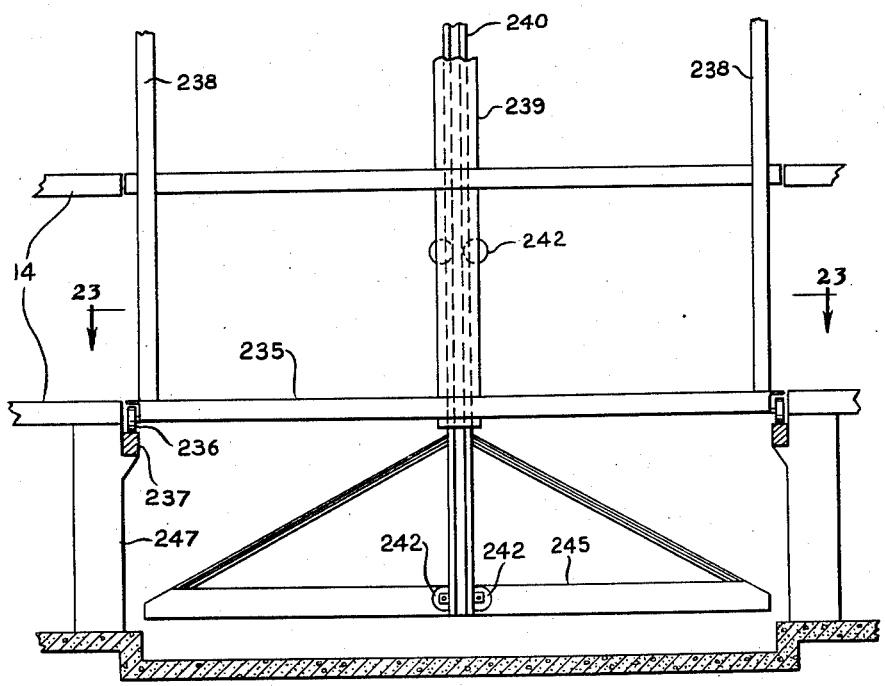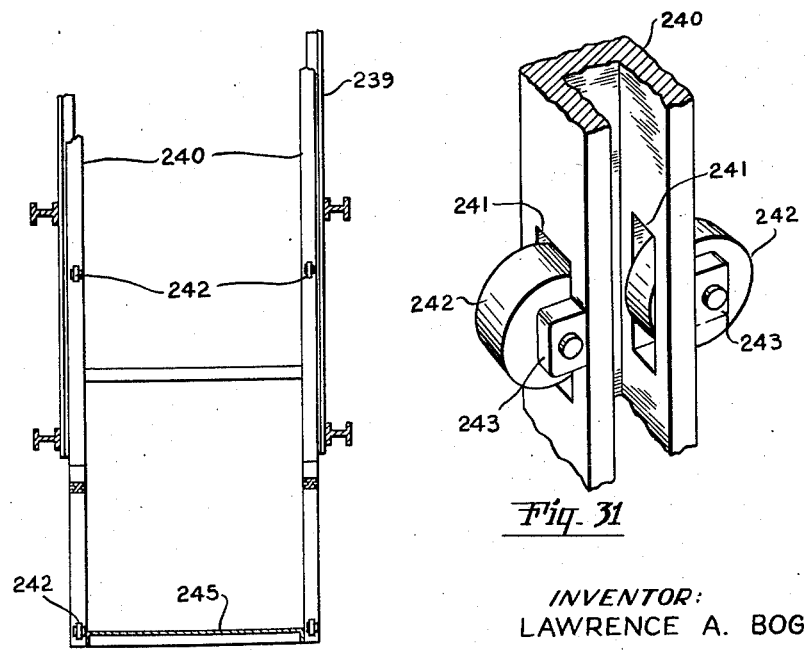

United States Patent Office 2,951,599
Patented Sept. 6, 1960

2,951,599

VEHICLE PARKING DEVICE

Lawrence A. Bogar, W. 3218 Daisy Ave., Spokane, Wash.

Filed June 15, 1956, Ser. No. 591,764

16 Claims. (Cl. 214—16.1)

This invention relates to the general class of material and article handling, and more particularly to a novel automobile transfer carrier mounted on the platform of a two directional elevator which travels both horizontally and vertically in a corridor of a multi-story building structure having vertically arranged stories or levels, for use in the storage of automotive vehicles or commodities which may be handled in like manner.

The construction of this invention features a transfer carrier having telescoping slides including a dolly designed to be mounted upon an elevator and movable transversely thereof for depositing a vehicle in a selected storage space as well as for removing the vehicle from the storage space and depositing it upon the elevator. While the elevator carries the transfer carrier and vehicle vertically, the whole elevator carriage moves horizontally on tracks either from above or below. In this way, the elevator can serve as many vertical tiers of parking spaces as desirable.

An object of the invention resides in the provision of an improved transfer carrier, which is carried on the platform of an elevator, specifically designed for this purpose, and which includes means for extending it from the elevator platform in either direction for the purpose of picking up a vehicle and depositing it on the elevator as well as for depositing it into a selected storage space.

Another object is to provide an improved transfer carrier utilizing longitudinally disposed drive means thereon operative in conjunction with novel clamping members for extending said carrier over the end of a supporting elevator platform.

A further object is to provide an elevator carriage running on tracks above the entrance and exit level in a corridor between tiers of parking spaces and having an elevator platform capable of descending below the carriage tracks to the entrance and exit level at a certain station or stations in the corridor.

Still further objects and features of this invention reside in the provision of an automobile parking device which is relatively inexpensive in construction, capable of reducing the amount of space necessary for vehicles stored in a building, which eliminates the need of a network or aisles or drive for parking vehicles, and which is highly efficient in operation.

These, together with the various ancillary objects and features of the invention, which will become apparent as the following description proceeds, are attained by this vehicle parking device, preferred embodiments of which have been illustrated in the accompanying drawings, by way of example only, wherein:

Figure 6 is an enlarged plan view of the transfer carrier;

Figure 7 is an enlarged vertical sectional view as taken along the plane of line 7—7 in Figure 6 and illustrating the construction of the telescoping slides;

Figure 8 is a longitudinal sectional view illustrating the construction of the transfer carrier and showing the transfer carrier in an extended position;

Figure 9 is a vertical sectional view as taken along the plane of line 9—9 in Figure 7 and illustrating the construction of the means for actuating and operating the upper and lower slides with the transfer carrier being shown in a telescoped position;

Figure 10 is an enlarged sectional detail view as taken along the plane of line 10—10 in Figure 9;

Figure 11 is a sectional detail view illustrating the roller construction of the upper slide;

Figure 12 is a plan view of a modified form of transfer carrier employing four telescoping sections;

Figure 13 is an enlarged plan view of the modified form of transfer carrier and showing the arrangement of a tubular power line assembly utilized in conjunction with the telescoping slides;

Figure 14 is an enlarged vertical sectional view as taken along the plane of line 14—14 in Figure 13;

Figure 15 is a schematic diagram illustrating another modified form of transfer carrier;

Figure 16 is an elevational view of a further modified form of transfer carrier;

Figure 17 is an elevational view of the carrier of Figure 16 in extended position;

Figure 18 is an elevational view of still another modified form of transfer carrier;

Figure 19 is an elevational view of the carrier of Figure 18 in extended position;

Figure 20 is an elevational view of yet another form of carrier;

Figure 21 is an elevational view of the carrier of Figure 20 in extended position;

Figure 22 is a sectional view taken on the line 22—22 of Figure 20;

Figure 23 is a sectional view, taken on the line 23—23 of Figure 29, showing a modified form of elevator and carriage therefor and also showing clamp members utilized with the embodiments of Figures 16 and 18;

Figure 24 is a fragmentary plan view of a transfer carrier showing in particular the structure of the clamps illustrated in Figures 16, 18 and 23, the clamp being shown in released or unlocked position;

Figure 25 is a side elevational view taken on the line 25—25 of Figure 24;

Figure 26 is a view similar to Figure 24 but showing the clamp in locked position;

Figure 27 is a sectional view taken on the line 27—27 of Figure 26;

Figure 28 is a sectional view taken on the line 28—28 of Figure 26;

Figure 29 is a fragmentary elevational view of a modified form of elevator carriage;

Figure 30 is a sectional view taken on the line 30—30 of Figure 23; and

Figure 31 is a fragmentary perspective view of a roller carrying structure utilized on the elevator carriage of Figure 29.

Figure 1:
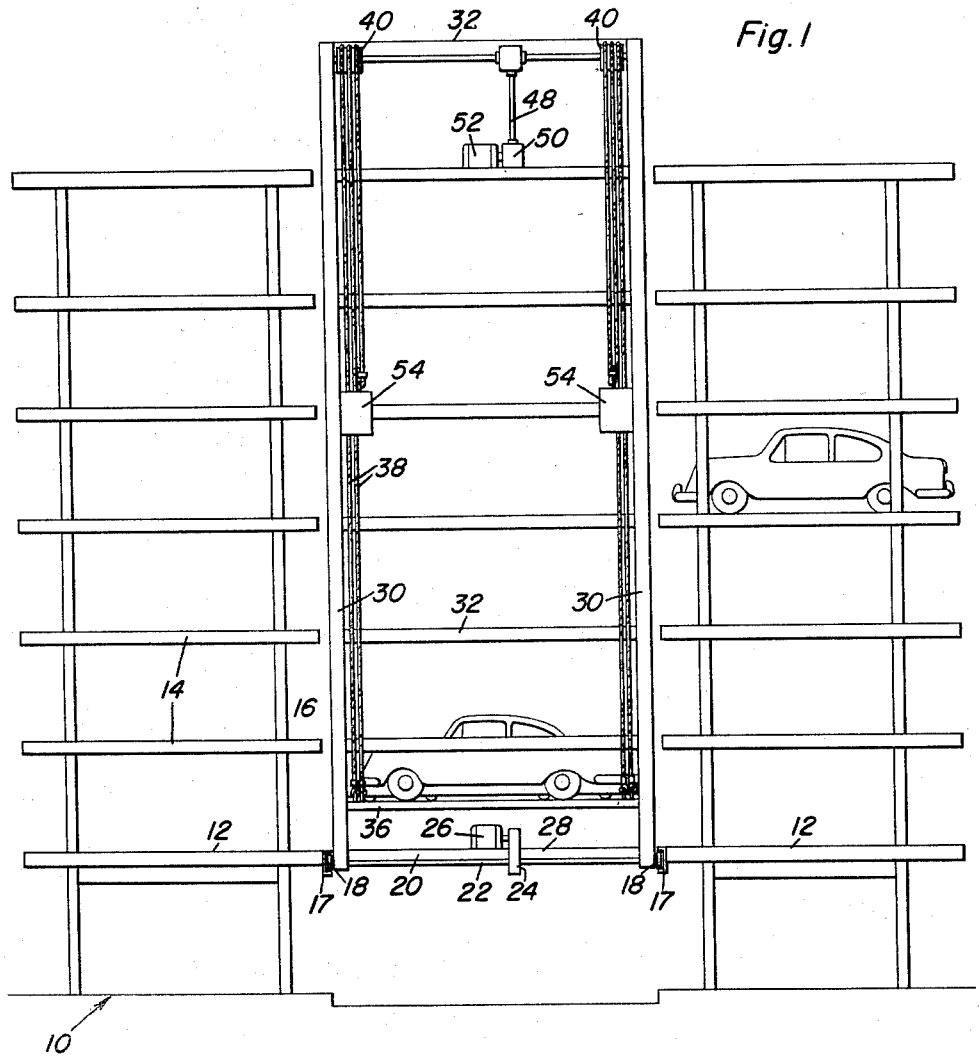
Figure 1 is an elevational view of the vehicle parking structure comprising the present invention.
Figure 3:
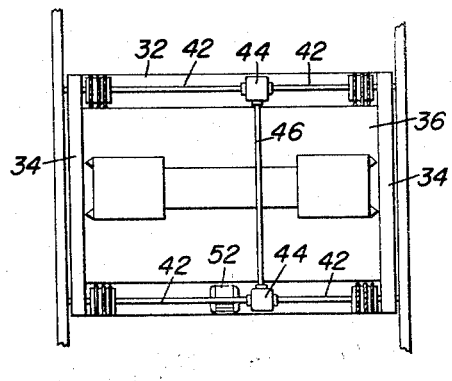
Figure 3 is a plan view of the cable mounted elevator illustrating the drive means therefor.
Figure 2:
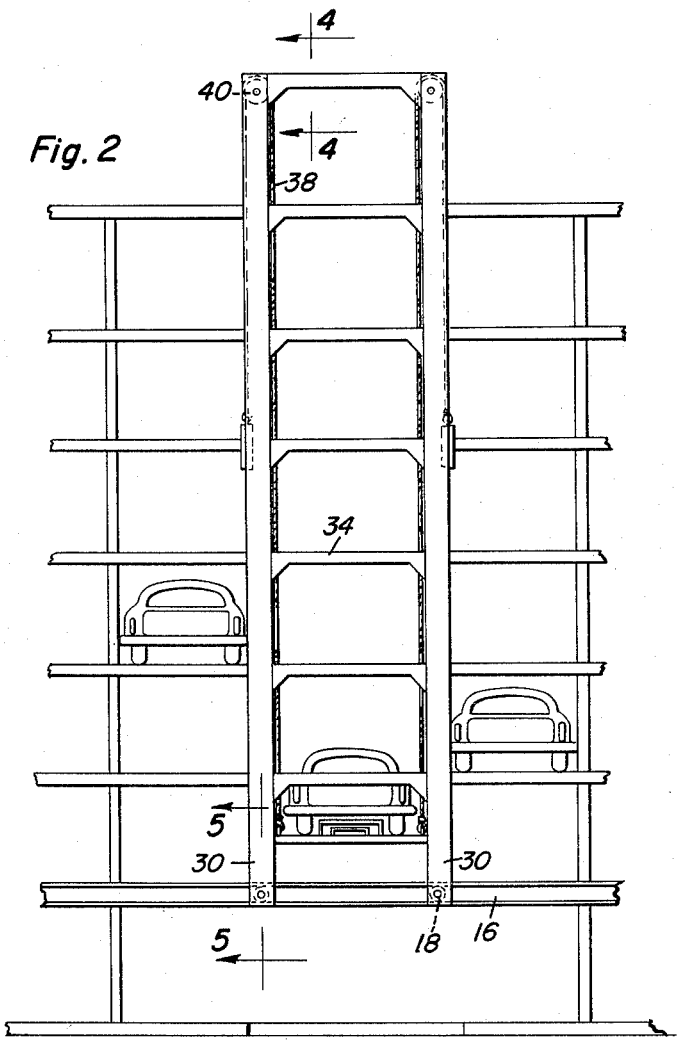
Figure 2 is a vertical sectional longitudinal view of the vehicle parking structure and illustrating the construction of the elevator in detail.
Figure 5:
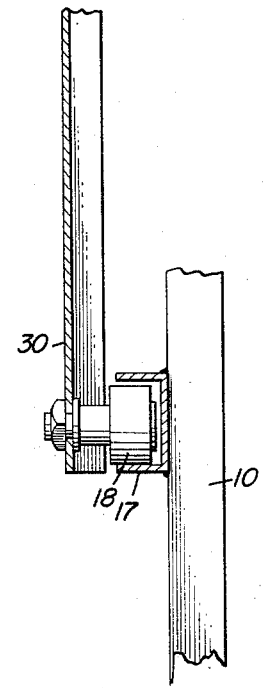
Figure 5 is a sectional detail view as taken along the plane of line 5—5 in Figure 2 illustrating the construction of the means for mounting the elevator carriage for horizontal movement.
Figure 4:
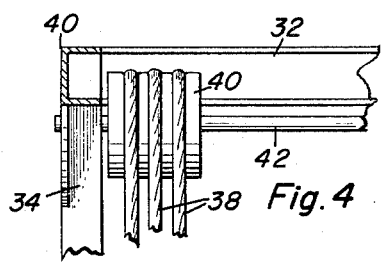
Figure 4 is a sectional detail view as taken along the plane of line 4—4 in Figure 2 and showing in an enlarged scale the construction of one of the drums on which the cable for raising and lowering the elevator is entrained.

With continuing reference to the accompanying drawings wherein like reference numerals refer to similar parts throughout the various views, reference numeral 10 is used to generally designate the vehicle parking structure comprising the present invention which includes a plurality of parking spaces 12 formed by the horizontal floors or decks 14 of the building structure 10. The parking structure 10 is arranged so that an opening forming an aisle is provided which is indicated by reference numeral 16. The arrangement of parts of the parking structure may be selected in conformance with various building codes.

Supported at the first floor level of the structure 10 above the ground level are rails 17 of generally channel-shape in which the supporting flanged wheels 18 of the wheeled conveyor or elevator carriage 20 are mounted. The wheels 18 are driven by means of shafts 22 connected through a gear box 24 to a drive motor 26 for moving the wheeled conveyor 22 horizontally with respect to the building 10. The motor 26 as well as the gear box 24 are supported on a platform 28 from which four upright channel beam frame 30 rise, one at each corner of the conveyor 20. The upright guide frames 30 are supported laterally by cross-braces 32 and 34 at each floor level of the storage structure.

An elevator platform 36 is suspended from the wheeled vehicle conveyor 20 by means of pairs of cables 38 at each corner of the conveyor 20 which are led over grooved drums 40 mounted adjacent the upper corners of the wheeled vehicle conveyor 20. The cables 38 are sufficiently wrapped around the drum 40 so as to raise and lower the elevator platform 36 without slippage. The drums 40 are driven by means of drive shafts 42 each of which is interconnected to either of the gear boxes 44 which themselves are interconnected by means of a shaft 46. One of the gear boxes 44 is driven by a shaft 48 which is connected to a further gear box 50 driven by a motor 52. In this manner, the four drums 40 are directly connected so that their rotation is exactly the same, thereby maintaining the elevator platform 36 constantly level.

It is noted that the elevator platform 36 may be counterweighted by suitable counterweights 54 attached to each of the pairs of cables 38. Likewise, there is mounted on the elevator platform 36 the transfer carrier designated generally by reference numeral 56. This transfer carrier or dolly 56 includes a telescoping lower slide 58 and an upper slide 60 which carries a support 62 for the vehicle and may carry a jack or other suitable means for raising a vehicle off the support 62 and depositing it in a storage space when the transfer carrier 56 is in an extended position.

Mounted on sprockets 64 journaled in suitable bearing blocks 66 carried by the platform 36 is an endless chain 68 having a plurality of depending teeth 70. These depending teeth are adapted to engage the individual lugs 72 forming a set of lugs on the lower slide 58. Hence, upon movement of the endless chain 68, the teeth 70 by engagement with the lugs 72 will cause the movement of the lower slide 58 in either of the directions, as is shown in Figure 8. Simultaneous with the movement of the endless chain 68, the teeth 74 of an endless chain 76 will engage the lugs 78 mounted on the elevator platform 36, causing the simultaneous operation of the endless chain 76. The operation of the endless chain 76 which is entrained about sprockets 80 carried by the lower slide 58 will cause movement of the upper slide 60 due to the fact that the teeth 74 of the endless chain 76 will engage lugs 82 depending from the upper slide 60. The movement of the lower slide 58 and of the upper slide 60 is restrained to longitudinal movement by the T-shaped tracks 61 and 63 affixed to the lower slide 58 and which cooperate with the L-shaped members 65, 67 rising from the platform 36 and the L-shaped members 69, 71, depending from the upper slide 60. As is shown in Figure 10, the sprockets, such as the sprockets 80, are mounted in suitable spaces 84 formed by slots in the lower slide 58 by means of stub shafts 86 or the like.

The front end of the upper slide 60 at the corners thereof is provided with buffers 88, and rollers 90 are mounted on this slide by means of stub axles 92 so that the slide can properly engage the supporting surface of the storage area when in an extended position, as is shown in Figure 8. Likewise, other rollers 90 may be provided by suitable mounting medial the ends of the upper slide 60. One of the sprockets 64 is driven through a shaft 94 connected to a motor 96 which may be manually controlled, the motor 96 being mounted on the elevator platform 36.

Although the transfer carriage 56 is shown as having only two slides, the upper and lower slides, it is to be understood that the transfer carrier may contain more telescoping slides as may be desired. Further, as is shown in the embodiment of the invention in Figures 12, 13 and 14, a modified elevator platform 110 may have three slides 112, 114 and 116 mounted thereon for telescoping movement. The elevator platform 110 is provided with recesses, as at 113, in which gears 115 are rotatably mounted, the gears 115 being adapted to engage teeth 117 depending from the slide 112. Mounted on the slide 112 are gears 118 which engage teeth 120 mounted on the platform 110 and also teeth 122 mounted on the intermediate slide 114. The intermediate slide 114 has gears 124 mounted thereon which are engaged with teeth 126 carried by the lower slide 112 and also teeth 128 carried by the upper slide 116. Hence, suitable drive means comprising a shaft 130 driven by a motor 132 is connected to the gears 115 and will drive the gears 115 to cause simultaneous operation of the respective slides in either of the directions as is shown in Figure 12.

For actuating the jack means provided for lifting the vehicle off the transfer carrier, there may be provided a pneumatic or hydraulic hose or other tubular conduit which is generally indicated by reference numeral 134. The hose may be entrained about a first pulley 136 carried by the platform 110, the pulley 136 being resiliently mounted by means of springs 138 so as to provide a continuous tightening action on the hose 134. The hose 134 is then entrained about a sheave 140 also carried by the platform 110, a sheave 142 carried by the slide 112, as well as about a sheave 144 carried by the slide 114. The transfer carrier actually hoists the vehicle clear of the floor when picking it up and does not lower it until the vehicle has been placed in a parking stall.

The slide 116 may be provided with suitable rollers, as at 146, for engagement upon the supporting surface of the vehicle storage structure.

Hence, upon operation of the motor 132, the slides 112, 114 and 116 may be extended in either direction, depending upon the direction of operation of the motor 132 which is, of course, a reversible motor. This will cause the hose 134 to be freely moved into position where the end thereof can be engaged with the jack means for actuating the jack means to lift the vehicle mounted on the transfer carrier off and into the storage space.

Referring now to Figure 15, there is shown schematically an arrangement of parts including four telescoping slides 160, 162, 164 and 166 which are mounted in telescoping relationship with the platform 168. A power line 170 is secured to the platform 168 and the slide 160 and is entrained about pulleys 172, 174 and 176 mounted on the slides 166, 164 and 162, respectively. As can be seen schematically, the design and arrangement of the pulleys and slides are such that telescoping of the slides in either direction will not require any change in the length of the power line 170, and, therefore, the power line is secured to the platform 168 and the slide 160 in any convenient manner. This power line may consist of an electric conduit or pneumatic hose.

Referring to Figures 16 and 17, there is shown a modified transfer carrier utilized in conjunction with the elevator platform 36 and having a lower slide 180 and an upper slide or dolly 181. The lower slide 180 has a pair of idler sprockets 182 journaled adjacent opposite ends thereof, and trained around the sprockets 182 is an endless chain belt 183 constituting a flexible drive member for the dolly 181. Lower slide 180 is driven in either direction by suitable power means, not shown, and the upper and lower slides are guided in longitudinal movement relative to the platform and to each other by suitable guide means, all of which is disclosed in connection with embodiments described hereinbefore, and, more particularly, as shown in Figures 7 and 14.

The transfer carrier, or dolly, comprising the upper slide 181 is movable longitudinally in either direction to positions projecting beyond the end of the elevator platform, as shown in Figure 17. This figure shows one extended position of the carrier in full lines and the other extended position in dotted lines.

To accomplish relative movement between the slides and the platform and between the slides themselves, the embodiment of Figures 16 and 17 utilizes four clamps 185, 186, 187 and 188. The two upper clamps 185 and 186 are secured to the under surface of the upper slide 181, and the lower clamps 187 and 188 are secured to the upper surface of the elevator platform 36. The purpose of the clamps is to secure the chain 183 to the elevator platform 36 and to the upper slide 181 at predetermined points as the slides move relative to the elevator platform when a driving action is applied to lower slide 180. When the carrier is moved to the right, the clamps 185 and 188 are locked and the clamps 186 and 187 are released, whereby a driving connection is accomplished between one portion of the chain and the platform and between another portion of the chain and the upper slide. In such movement the upper slide travels at a faster rate, and farther, than the lower slide. When the carrier is to be moved to the left, the clamps 186 and 187 are locked and the clamps 185 and 188 are released.

In Figures 23-18 there is shown the structure and operation of the clamps 185—188. Each of these clamps has identical structure, and comprises a body portion 190 having a longitudinal guide groove 192 therein for slidably receiving a locking bar or bolt 193 having an integral pin 194 projecting upwardly above the body portion 190. Disposed in spaced relation from one end of the body portion 190 is an apertured block 195 adapted to receive the end of the locking bar 193, and disposed between the block 195 and the body portion 190 is a block or lug 196 having upwardly projecting teeth 197 arranged at certain times to be meshed with the chain 183 as shown in Figure 27. In the upper clamps 185 and 186 the body portions 190, blocks 195 and lugs 196 are secured to the upper slide 181 while in the lower clamps 187 and 188 these parts are mounted on the elevator platform 36.

Secured to the lower slide 180 are cams 198, each having off-set end portions 199 and having a longitudinal open end groove 200 through the entire length thereof. Cams 198 are disposed in predetermined positions on the slide 180 so that when they move past the clamps, the upstanding pin 194 of the locking bar 193 engages the groove 200, and, upon relative movement between the cams 198 and the clamps, the pin 194 by following the groove 200 in the cams will cause the locking bar to slide relative to the body portion 190. Referring to Figure 24, as the lower slide carries the cam 198 to the left, as shown by the arrow, this cam will cause the locking bar 193 to move into the aperture of the block 195, Figure 26, and lock the chain in meshing relation with the lug 196. In the other direction of movement the cam will move the pin outwardly away from the block 195 to release the chain from the lug 196.

Figure 23 shows the positions of the clamps 185 and 188, the upper slide 181 being shown in phantom outline and one end of the lower slide 180 being broken away. Cams 198 for the upper clamps 185 and 186 are mounted on the top of lower slide 180 and cams 198 for the lower clamps 187 and 188 are mounted in the same positions on the bottom of the lower slide. Movement of the lower slide 180 carries the bottom cams past the clamps 187 and 188 to accomplish the locking or unlocking functions, and, in the same movement, the upper slide 181 travels faster than the lower slide, whereby the clamps on the upper slide move past the top cams to accomplish the desired purpose. Thus, in movement in either direction the upper trailing clamp and the opposite lower clamp are locked, and the upper leading clamp and opposite lower clamp are unlocked to permit the chain and sprocket wheel 182 to pass therethrough.

Figures 18 and 19 show another transfer carrier embodiment somewhat similar to the embodiment shown in Figures 16 and 17, having a lower carrier 180 and an upper carrier, or dolly, 181. Idler sprockets 182 are journaled on each end of the lower slide 180, and trained about the sprockets 182 is a chain belt 205 constituting a flexible drive member having crossed end portions connected at points 206 and 207 at opposite ends of the upper slide 181. This structure utilizes lower clamps 187 and 188 which are associated with cams 198, as shown in Figures 24-28, for locking one of the clamps and releasing the other clamp in each direction of movement. In the leftward movement of the carrier the clamp 187 is closed and the clamp 188 is released, and, in the opposite direction of movement, the clamp 188 is closed and the clamp 187 is released. Lower slide 180 is propelled to the right or left by the chain and lug means shown in Figure 7, the rack and gear means shown in Figure 14, or any other suitable means, represented by the force arrows F in Figures 17 and 19.

Figures 20, 21 and 22 show still another form of carrier structure utilized on the elevator platform 36. A lower slide 210 and an upper slide 211 are utilized in connection with this embodiment for carrying a vehicle. The slide 210 has T-shaped projections 212 cooperating with L-shaped members 213 and 214 on the elevator platform 36 and upper slide 211, respectively, for providing guided longitudinal movement of the slides relative to the elevator and to each other, the upper slide 211 having rollers 215 at its sides engageable with the elevator platform.

Depending from the elevator platform 36 are bearing brackets 216 in which is journaled a shaft 217 carrying drive pulleys 218. A drive motor 219 is mounted on the elevator for driving the shaft 217. The upper surface of elevator platform 36 has a plurality of lugs or teeth 222. Pulleys 218 have a belt 223 entrained therearound with end portions in crossed relation and secured to the lower slide 210 at points 224 and 225 adjacent opposite ends thereof. Journaled on opposite ends of the lower slide 210 are sprocket wheels 227 around which is trained a chain belt 228 constituting a flexible drive member having end portions in crossed relation and secured to the upper slide 211 at points 229 and 230 adjacent opposite ends of said slide. The lower run of the chain 228 is engageable with the lugs 222 on the top surface of the elevator platform 36, and, when shaft 217 is rotated by drive motor 219, the belt 223 pulls the lower slide in a longitudinal direction, depending upon the direction of movement desired, causing the chain 228 to rotate around the sprockets 227 and produce longitudinal movement of the upper slide 211 relative thereto.

The driving means 218, 223 of Figure 20 may also be employed for reciprocating the lower slide 180 in Figures 16 and 18.

Referring specifically to Figures 23 and 29-31, there is shown a parking structure intended to store or park vehicles over a first floor which may be used for other purposes. In this structure an elevator carriage 235 has wheels 236 operable on tracks 237 for moving the carriage along tiers of storage spaces 12. The carriage 235 has corner frame members 238 and has a pair of T-shaped guides 239 at its sides on which is mounted for vertical guided movement a channel-shaped extension bar 240. The bar 240 has pairs of apertures 241 in its side walls for receiving guide rollers 242 journaled in ears 243 secured to the outer surface of the bar side walls. Carried at the bottom of the channel-shaped bars 240 is an elevator platform 245 corresponding to the platform 36 in the previous embodiments.

To lower the elevator platform 245 to the street level for receiving or discharging vehicles, the building structure with which the parking structure is associated is provided at a desired location, such as at one side thereof, with a well or opening 247 into which the elevator platform may be lowered. Except for this well portion the first floor of the building may be used for other purposes. The telescoping members 239 and 240 permit the elevator platform to be lowered to a level below the bottom row of storage spaces or stalls 14 and, after receiving the vehicle or discharging it, the elevator platform can be moved vertically out of the well and then the carriage driven on its tracks to a desired transverse position in order to bring the elevator platform into registry with a certain stall. A substantially frictionless sliding connection between the telescoping members 239 and 240 is accomplished by the rollers 242 which project through the apertures 241 into engagement with the guides 239.

The various dolly transfer mechanisms hereinabove described are incorporated in the platform 245 the same as in platform 36.

This application is a continuation-in-part of application Serial Number 475,798, filed December 16, 1954, and now abandoned.

From the foregoing, the construction and operation of the device will be readily understood and further explanation is believed to be unnecessary. However, since numerous modifications and changes will readily occur to those skilled in the art, it is not desired to limit the invention to the exact construction shown and described, and, accordingly, all suitable modifications and changes may be resorted to, falling within the scope of the appended claims.

I claim:

1. A transfer carrier for use in a parking garage comprising an elevator platform, a lower slide carried on said platform, first means for moving said lower slide relative to said platform, an upper slide mounted above said lower slide and having rollers engaging said platform, and second means associated with said lower slide for moving said upper slide upon movement of said lower slide, said first means including a first endless chain having depending teeth and a first set of lugs on said lower slide engageable by said teeth, said second means including a second endless belt carried by said lower slide having teeth engageable with a second set of lugs attached to said platform and a third set of lugs on said upper slide.

2. A transfer carrier for use in a parking garage comprising an elevator platform, a lower slide carried on said platform, first means for moving said lower slide relative to said platform, an upper slide mounted above said lower slide and having rollers engaging said platform, and second means associated with said lower slide for moving said upper slide upon movement of said lower slide, said first means including a first endless chain having depending teeth and a first set of lugs on said lower slide engageable by said teeth, said second means including a second endless belt carried by said lower slide having teeth engageable with a second set of lugs attached to said platform and a third set of lugs on said upper slide, means for raising and lowering said elevator platform, and means for moving said elevator platform horizontally.

3. A transfer carrier for moving a load off opposite ends of a platform comprising a load carriage having an intermediate position on said platform and adapted to travel in opposite directions clear of said platform, a slide between said platform and said carriage, means for reciprocating said slide in opposite directions extending beyond the ends of said platform, an endless belt trained around the ends of said slide, means on said platform releasably engaging one reach of said belt at opposite ends of said platform, said belt disengaging one of said means whenever said slide moves away therefrom, and means on said carriage releasably engaging the other reach of said belt at opposite ends of said carriage, said belt disengaging said last means on the leading end of said carriage whenever one end of said carriage moves beyond said slide in either direction of travel, said belt driving said carriage through said engaging means on the trailing end of said carriage.

4. A transfer carrier for moving a load off opposite ends of a platform comprising a load carriage having an intermediate position on said platform and adapted to travel in opposite directions clear of said platform, a slide between said platform and said carriage, means for reciprocating said slide in opposite directions extending beyond the ends of said platform, a belt trained around the ends of said slide, means engaging said belt with the trailing end of said carriage to drive said carriage in each direction of travel, means engaging a single reach of said belt with the opposite ends of said platform, and means releasing said platform engagement of the belt at the end of the platform opposite the direction of travel in each direction of travel.

5. A transfer carrier as defined in claim 4, said belt being an endless belt having only two reaches between the ends of said slide.

6. A transfer carrier as defined in claim 4, said belt having crossed ends permanently connected with the opposite ends of said carriage.

7. A transfer carrier as defined in claim 4, said means engaging said belt with the opposite end sof said platform comprising locking bar clamps, and said releasing means comprising cams on said slide engageable with said locking bars to move the bars into clamping and release positions in opposite directions of movement of the slide.

8. A transfer carrier as defined in claim 5, said belt being an endless chain belt releasably engaged by rack lugs on said platform and said carriage.

9. A transfer carrier as defined in claim 5, said means engaging said belt with the trailing end of said carriage in each direction of travel comprising locking bar clamps on opposite ends of the carriage and cams on said slide engageable with said locking bars to move the bars into clamping and release positions in opposite directions of movement of the slide.

10. In a storage building having an elevator platform movable vertically to floors on different levels, a transfer carrier for moving a load on and off opposite ends of said platform, said transfer carrier comprising a load carriage and a slide between said platform and said carriage, said carriage having wheels supporting the carriage in an intermediate position on said platform and adapted to travel on said floors at opposite ends of said platform, a single belt trained around the ends of said slide, means on said platform releasably engaging one reach of said belt at said opposite ends of said platform, said belt disengaging one of said means whenever said slide moves away therefrom, and means for reciprocating said slide with said belt in opposite directions beyond said ends of said platform, said belt having traction engagement with the opposite ends of said carriage and said belt pulling said carriage through the traction engagement with the trailing end of the carriage to a position on said floor clear of said platform by movement of said slide in either direction partially beyond the end of said platform.

11. The structure defined in claim 10 wherein said belt is an endless chain belt engaged by rack lugs on said platform and said carriage.

12. The structure defined in claim 11 wherein said means for reciprocating said slide comprises an endless chain belt mounted on sprockets on said platform and engaged by rack lugs on said slide.

13. The structure defined in claim 10 wherein said belt is an endless chain belt engaged by releasable clamps on the opposite ends of said platform and carriage.

14. The structure defined in claim 10, said belt having crossed ends connected with the opposite ends of said carriage.

15. In a storage building having an elevator platform movable vertically to floors on different levels, a transfer carrier for moving a load on and off opposite ends of said platform, said transfer carrier comprising a load carriage and a slide between said platform and said carriage, said carriage having wheels supporting the carriage in an intermediate position on said platform and adapted to travel on said floors at opposite ends of said platform, an endless belt trained around the ends of said slide, means for reciprocating said slide with said belt in opposite directions beyond said ends of said platform, means on said platform releasably engaging one reach of said belt at said opposite ends of said platform, said belt disengaging one of said means whenever said slide moves away therefrom, and means on said carriage releasably engaging the other reach of said belt at opposite ends of said carriage, said belt disengaging said last means on the leading end of said carriage whenever one end of said carriage moves beyond said slide in either direction of travel, said belt propelling said carriage on said floor to a position clear of said platform when said slide is moved in either direction partially beyond the end of said platform.

16. The structure defined in claim 15 wherein said means for reciprocating said slide comprises a belt mounted on sprockets on said platform and having traction engagement with said slide.

References Cited in the file of this patent

UNITED STATES PATENTS

| | | |
|---|---|---|
| 1,779,998 | Beecher et al. | Oct. 28, 1930 |
| 2,165,641 | Mattox | July 11, 1939 |
| 2,348,019 | Norbom | May 2, 1944 |
| 2,626,647 | Sanders et al. | Jan. 20, 1953 |
| 2,647,647 | Alimanestiano | Aug. 4, 1953 |
| 2,652,938 | Murphy | Sept. 22, 1953 |
| 2,667,983 | Billings | Feb. 2, 1954 |
| 2,685,260 | Auger | Aug. 3, 1954 |
| 2,714,456 | Manaugh | Aug. 2, 1955 |
| 2,788,905 | Grove | Apr. 16, 1957 |